Figure 1:
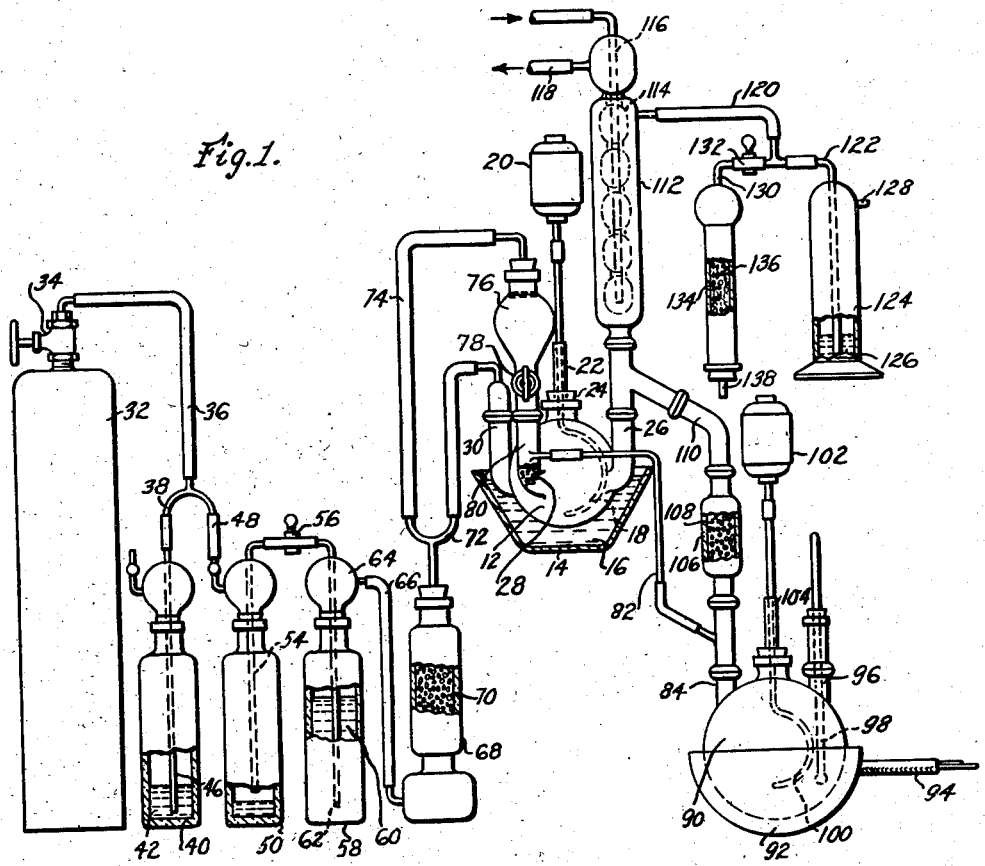

Jan. 21, 1947.  C. E. ARNTZEN  2,414,505
CONTINUOUS GRIGNARD REACTION PROCESS
Filed Sept. 15, 1943  2 Sheets-Sheet 1

WITNESSES:

INVENTOR
Clyde E. Arntzen.
BY
ATTORNEY

Jan. 21, 1947.  C. E. ARNTZEN  2,414,505
CONTINUOUS GRIGNARD REACTION PROCESS
Filed Sept. 15, 1943  2 Sheets-Sheet 2

WITNESSES:

INVENTOR
Clyde E. Arntzen.
BY
ATTORNEY

Patented Jan. 21, 1947

2,414,505

UNITED STATES PATENT OFFICE 2,414,505

CONTINUOUS GRIGNARD REACTION PROCESS

Clyde E. Arntzen, Wilkinsburg, Pa., assignor to Westinghouse Electric Corporation, East Pittsburgh, Pa., a corporation of Pennsylvania Application September 15, 1943, Serial No. 502,451

3 Claims. (Cl. 260—684)

This invention relates to the apparatus and a method of preparation of chemical products wherein an organometallic compound, such as a Grignard reagent, is employed.

A variety of chemical reactions have been carried out by the use of Grignard reagents which are solutions of organomagnesium compounds. The Grignard reagent is an extremely convenient and controllable reagent by means of which organic compounds may be synthesized. Particularly for laboratory work the use of a Grignard reagent permits the ready and convenient preparation of a great variety of organic compounds.

Heretofore, the application of Grignard reagents to relatively large scale production has been attended with certain difficulties. The reagent was usually prepared separately in a relatively large quantity of ether. The use of such large quantities of ether is inconvenient and dangerous as a fire hazard. A further difficulty is met in that the concentration of the organomagnesium compound in the ether frequently determines which one of several possible reactions would be favored. Other disadvantages such as length of time to complete a total reaction and the like are known to those skilled in the art.

The object of this invention is to provide for substantially continuously producing and supplying a predetermined concentration of Grignard reagent in a solvent to a vessel in which a reaction involving the reagent occurs.

Another object of the invention is to provide an apparatus for conducting predetermined complementary chemical reactions in which a Grignard reagent is produced in one portion of the apparatus as an ether solution of predetermined concentration and circulated to another portion in which a second chemical reaction takes place and the ether recovered and recirculated to the initial Grignard reaction whereby relatively small amounts of ether are required.

A still further object of the invention is to provide for introducing a predetermined concentration of Grignard reagent in ether substantially continuously to take part in a primary chemical reaction involving the Grignard reagent to provide for a predetermined type of product.

Figure 2:
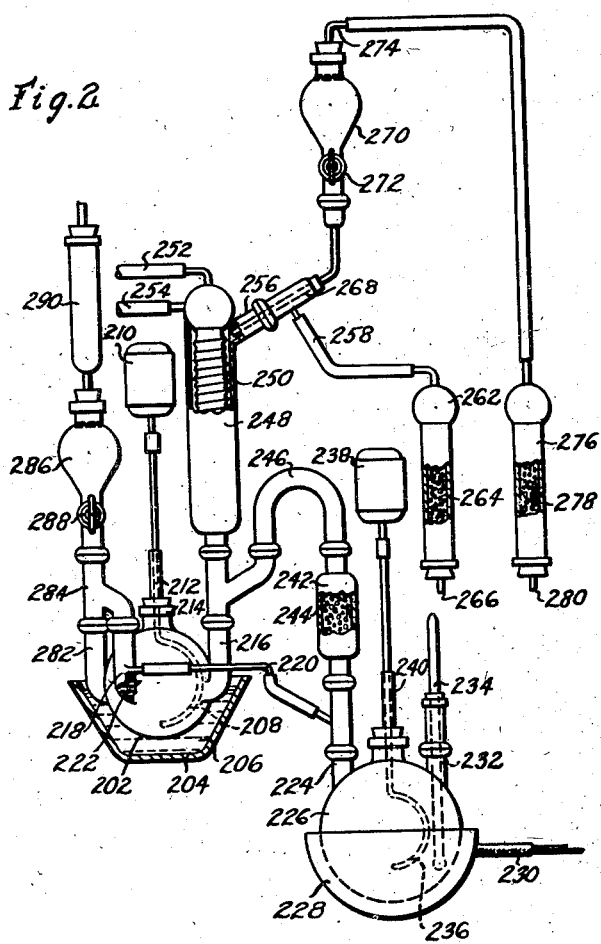

Other objects of the invention will, in part, be obvious, and will, in part, appear hereinafter. For a fuller understanding of the nature and objects of the invention, reference should be had to the following detailed drawings, in which:

Figure 1 is a schematic view in elevation partly in section of one form of apparatus according to the invention, and Fig. 2 is a plan in elevation partly in section showing schematically a second form of the invention.

Referring to Fig. 1 of the drawings, there is illustrated an apparatus in which organic halides in gaseous form may be employed in carrying out reactions involving the preparation and use of the Grignard reagent. The apparatus is particularly suited for producing organometallic compounds, such as organosilicon alkoxides. Such compounds may be prepared in the apparatus by reacting an organic silicate, for example, ethyl silicate, with a Grignard reagent to substitute an alkyl group for an alkoxide group. There are four possible reaction products that may be produced from ethyl silicate by this reaction. The substitution of a methyl group may be so carried out that a monomethylsilicon triethoxide, a dimethylsilicon diethoxide, a trimethylsilicon monoethoxide or tetramethylsilicon may be produced. The reaction is indicated in the following equations:

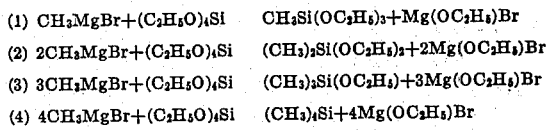

(1) $CH_3MgBr + (C_2H_5O)_4Si \quad CH_3Si(OC_2H_5)_3 + Mg(OC_2H_5)Br$ (2) $2CH_3MgBr + (C_2H_5O)_4Si \quad (CH_3)_2Si(OC_2H_5)_2 + 2Mg(OC_2H_5)Br$ (3) $3CH_3MgBr + (C_2H_5O)_4Si \quad (CH_3)_3Si(OC_2H_5) + 3Mg(OC_2H_5)Br$ (4) $4CH_3MgBr + (C_2H_5O)_4Si \quad (CH_3)_4Si + 4Mg(OC_2H_5)Br$ For purposes of preparing resins therefrom, the trimethylsilicon ethoxide and tetramethylsilicon are deemed undesirable. The monomethyl and dimethylsilicon ethoxides may be treated to produce highly desirable resinous materials and therefore the reaction favoring their production is preferred. It has been found that dilute solutions of methylmagnesium halide in ether favor the formation of the monomethyl and dimethyl forms of the product.

The apparatus of Fig. 1 permits the convenient and economical preparation of dilute solutions of methylmagnesium halide in ether. The problem of storing large volumes of an ether solution of a Grignard reagent and the tedious fractional distillation of the ether from the products is avoided by use of the apparatus.

The Grignard reagent is prepared in a first reaction vessel 12 disposed in a receptacle 14 containing a mixture 16 of ice and water in order to absorb the heat of reaction and to facilitate formation of the Grignard reagent. Disposed in the vessel 12 is a stirrer 18 operated by motor 20 through a sealing gland 22 attached to the neck 24 of the reaction vessel to provide for preventing escape of the contents of the vessel. The gland 22 may conveniently consist of a closely fitting tube around the shaft with a highly viscous lubricant applied to seal the space therebetween.

An organic ether such as ethyl ether to act as the solvent for the reaction product is introduced through the side neck 26 and the side neck 80 of the vessel 12 from sources to be set forth in detail. The organic halide taking part in producing the Grignard reagent enters through a second side neck 30. Magnesium metal particles are introduced as a mass into the reaction vessel 12 at the start of the operation. Means may be provided if desired for introducing magnesium particles from a container to the vessel 12 through a wide mouth valve (not shown) which may be operated at stated intervals to admit a small amount of magnesium metal without permitting gas to escape.

A gaseous organic halide, such, for example, as methyl bromide, is contained in a tank 32 and the amount of the methyl bromide introduced to the apparatus is determined by the setting of valve 34. Methyl bromide gas passes from the tank 32 into the line 36 which has a connection through a branch conduit 38 into a safety pressure regulator 40 containing a pool of mercury 42 into which the lower end of a tube 46 extends. The line 36 is connected by a branch line to an acid trap 50 to catch any acid backing up from a cleaning trap disposed further on in the line.

In order to purify the methyl bromide gas of water vapor or other deleterious matter, the conduit 54 is directed into the acid cleaning bottle 58 containing sulphuric acid 60. An extension of conduit 54 dips below the surface of the sulphuric acid 60 whereby the methyl bromide gas is bubbled through the acid. A pinch clamp 56 is provided on conduit 54 to shut off gas from flowing to the acid immersed conduit 62 in case the apparatus is not in use. Acid washed gas is collected in dome 64 of bottle 58 and conveyed by tube 66 to a calcium chloride absorption flask 68. The gas is introduced at the bottom of the flask 68 from where it passes through a body of granular calcium chloride 70 to the line 72 connecting to the neck 30 of vessel 12. Other means of purifying the organic halide may also be used.

A supply of ether for make-up purposes and the like is contained in the flask 76 from which its flow to neck 80 of vessel 12 is controlled by the valve 78. In order to maintain an equilibrium gas pressure at both faces of the ether in the flask 76 when the valve 78 is opened and exposed to the pressure in vessel 12, a bypass 74 is connected from the line 72 to the upper part of the flask 76.

To start the reactions, the first reaction vessel 12 is partially filled with magnesium metal, then ether is admitted from the flask 76 to a predetermined initial amount, and thereafter the stirrer 18 is set in motion. Into the second reaction vessel 90 is introduced a predetermined quantity of the reactant, ethyl silicate in this example, with enough ether to cause the mixture to boil at a given temperature. Valve 34 from the tank of organic halide is cracked open to admit the halide gas at a predetermined rate of flow through the sulphuric acid 60 and the calcium chloride 70 into the reaction vessel 12.

The reaction of the magnesium metal and the organic halide in the ether produces the so-called Grignard reagent. The addition of the various reactants gradually fills the reaction vessel 12 and the level of the ether solution therein rises up the neck 80 to the level of an outlet 82. The ether solution of Grignard reagent is filtered by a plug of glass wool or other fine filtering medium in neck 80 to prevent escape of particles of magnesium metal from the vessel. The Grignard reagent dissolved in the ether flows along the outlet 82 to the neck 84 of the second reaction vessel 90.

The reaction vessel 90 contains a chemical substance for reacting with the Grignard reagent which, in the specific examples hereinbefore stated, may be ethyl silicate. Obviously other substances may be present as desired.

The reaction vessel 90 is disposed within a heater 92 which is electrically operated by current supplied by the conductor 94. Other means of heating the reaction vessel 90 may be employed, for example, an immersion heater may be introduced into the vessel 90 or some other convenient heating device employed.

In order to determine the temperature in the reaction vessel 90, a thermometer 98 is admitted through the neck 96. A thermocouple or the equivalent may be substituted for the thermometer. The contents of the vessel 90 are maintained in a state of agitation by the stirrer 100 operated by the motor 102 through the sealing gland 104.

The temperature of the ingredients in the reaction vessel 90 is maintained at the boiling temperature of the ether. The rate of input of the heat is so adjusted as to cause the ether to distil through tube 110 and pass as condensate into flask 12 at a rate corresponding to ether flow through outlet 82 to flask 90.

The ether vapors rise up neck 84 to a portion 106 of enlarged diameter containing a quantity of glass beads and the like to function as a trap for particles of entrained liquid and for condensing vapor of material with a boiling point above the boiling point of the ether. Liquid particles caught on the beads 108 and condensed vapors trickle back slowly into the vessel 90. The liquid-free ether vapors pass upwardly through the tube 110 to a condenser 112 in which they are exposed to an extensive cooled surface 114 maintained at such a temperature as to cause liquefaction of the ether. A cold water inlet 116 provides for a flow of cold water within the condenser against the face of surface 114 opposite to that contacted by the ether vapors. The warmed water is removed through the outlet 118. The liquid ether condensed in the condenser 112 trickles at a predetermined rate through the neck 26 back into the reaction vessel 12 for producing further Grignard reagent.

As a pressure regulator for the methyl bromide gas, a tube 120 is connected to the condenser 112 and leads to a regulator 124. The pressure regulator contains a tube 122 connected to the tube 120 and leading a predetermined distance below the surface of a pool of mercury 126. The escape of bubbles at relatively long intervals assures the presence of the desired gas pressure. In case the gas pressure exceeds the pressure equivalent of the mercury 126 as determined by the depth of immersion of tube 122 below the surface thereof, the vapors escape to the atmosphere through the outlet 128.

When the apparatus of Fig. 1 is to be initially employed, it must be purged of air in order to avoid the oxidation of the Grignard reagent or an ether vapor explosion. In such case, the pinch clamp 132 is opened and the ether vapors and methyl bromide are permitted to displace the air in the apparatus. The air passes through tube 120 and then through line 130 through chamber 134 containing a supply of a desiccant 136, such as calcium chloride, and through the outlet 138. The calcium chloride is present mainly to prevent admission of moisture to the apparatus in case the internal pressure of the apparatus falls below atmospheric air pressure when valve 132 is open.

It will be obvious that a relatively small initial quantity of ether will be satisfactory for continuously producing a predetermined output of Grignard reagent in the first reaction vessel 12 and for conveying the reagent to the second reaction vessel 90 whereby the desired composition is produced. The small amount of ether is continually recirculated to act as solvent for more Grignard reagent. By admitting more ether from the storage flask 76, the boiling point of the mixture in vessel 90 may be lowered.

In some cases it may be desirable to employ liquid organic halides instead of the gaseous halide employed in the Fig. 1 modification of the apparatus. Referring to Fig. 2 of the drawings, there is illustrated a modified form of the invention comprising an apparatus in which the reactions may be carried out employing a liquid organic halide. The apparatus of Fig. 2 is composed of a first reaction vessel 202 for preparing the Grignard reagent, the vessel being disposed in a pan 204 containing an ice and water mixture 206 to maintain a low temperature. A stirrer 208 for agitating the contents in the reaction vessel 202 is operated by the motor 210 through the gland 212 passing through the neck 214 of the vessel. The organic halide and condensed ether are admitted to the vessel 202 through a side neck 216. The Grignard reagent produced from the reaction of the magnesium metal and liquid organic halide in ether rises within the reaction vessel 202 through the filter plug of glass wool, or the like, 222 to the outlet 220. The Grignard reaction flows through the outlet 220 into neck 224 of the reaction vessel 226 where the main reaction takes place.

The second reaction vessel 226 is heated to a temperature above the boiling point of the ether by the heating means 228 operated by an electrical current flowing through the conductor 230. The temperature of the vessel contents may be determined by the thermometer 234 passing through the neck 232 of the vessel. Stirring of the contents of the vessel is effected by the stirrer 236 operated by the motor 238 passing through sealing gland 240.

Ether vapors produced by the heating of the flask 226 rise through the neck 224 to a fractionation column 242 containing glass beads or other equivalent material 244 to trap liquid particles and to condense high boiling point liquid vapors. An inverted-U neck 246 conveys the liquid-free vapors to the condenser 248.

Within the condenser 248 is disposed an extended cooled surface 250 maintained at a temperature sufficient to cause ether vapors to condense by the flow of cooling water or the like through an inlet 252 and vented through an outlet 254. Liquid ether produced by condensation trickles through the neck 216 back to the reaction vessel 202 to act as a solvent in the further production of Grignard reagent.

Connected to the top of the condenser is a tube 256 which permits the purging of air from the apparatus when being initially employed at which time the mixture is vented through the tube 258 and passed through the chamber 262 containing a desiccant 264, such as calcium chloride, and through the outlet 266 to the atmosphere. The function of the calcium chloride is to prevent moisture being admitted in case the apparatus is accidentally maintained below atmospheric pressure. Within the tube 256 is disposed a smaller inlet 268 for introducing a liquid organic halide from the reservoir 270 when control valve 272, connected therewith is in the open position. The liquid organic halide is maintained in the supply vessel 270 and is admitted at a predetermined rate of flow. Dry atmospheric air is admitted above the level of ether and organic halide from the line 274 which receives dry air from a chamber 276 filled with granular particles of a desiccant 278, such as calcium chloride or other moisture absorbent agent, for drying atmospheric air entering by means of the inlet 280.

Under some conditions, the neck 218 of the vessel 202 will fill with Grignard reagent solution and siphon in a steady stream through the outlet 220. To prevent this from occurring, the neck 282 is connected to the neck 218 by a bypass 284 which breaks the vacuum apparently caused by the condensation of ether in the neck.

In case additional ether requires to be added to the vessel 202, the flask 286 provided with valve 288 is connected to the bypass 284. A moisture absorbing air admitting trap 290 is connected to the flask 286 to permit air to enter as ether is withdrawn.

It will be apparent that when the apparatus of either Fig. 1 or Fig. 2 is to be employed on a large scale, the several vessels wherein the reactions take place may be in the form of large autoclaves or the like with suitable changes in the various pipes and other fixtures to permit a more suitable control of the flow and passage of the several ingredients. Where calcium chloride has been indicated as a moisture absorbent, other dehydrating agents may be made use of with substantially similar results, for instance, anhydrous calcium sulphate or the like may be substituted. The cooling mixture to ensure a satisfactory Grignard reagent reaction may be other refrigerants than ice and water as indicated above. As mentioned previously, magnesium metal may be added from a source of supply by equipping the supply device with a large aperture valve or a metering member to permit particles to flow therethrough into the Grignard reagent vessel.

Solid organic halides dissolved in a minimum amount of the ether may also be employed in the form of the apparatus of Fig. 2 described for use with liquid organic halides.

Other metals, such as lithium, which readily form reactive organometallic compounds with organic halides may also be used instead of magnesium.

Since certain changes may be made in the apparatus above described and different embodiments of the invention could be made without departing from the spirit thereof, it is intended that all matter contained in the above description be considered as illustrative and not in a limiting sense.

I claim as my invention:

1. In the process of preparing a reaction product over a period of time involving the use of a solution of a Grignard reagent in an ether which comprises applying to magnesium metal in a first zone substantially continuously during the reaction period an organic halide and ether to produce the solution of Grignard reagent in the ether, withdrawing substantially continuously throughout the reaction period the solution of Grignard reagent from said first zone and conveying the solution to a second zone containing a substance which reacts with the Grignard reagent to form a relatively non-volatile product, distilling off the ether substantially continuously from the second zone, condensing the ether vapors, and substantially continuously conveying the condensed liquid ether to said first zone to prepare additional solution of Grignard reagent, whereby the ether is recirculated and a relatively small amount is employed.

2. In the process of preparing a reaction product over a period of time involving the use of a solution of a Grignard reagent in an ether which comprises applying to magnesium metal in a first zone substantially continuously during the reaction period an organic halide and ether to produce the solution of Grignard reagent in the ether, withdrawing substantially continuously throughout the reaction period the solution of Grignard reagent from said first zone and conveying the solution to a second zone containing a substance which reacts with the Grignard reagent to form a relatively non-volatile product, distilling off the ether substantially continuously from the second zone, condensing the ether vapors, and substantially continuously conveying the condensed liquid ether and additional organic halide admixed in the ether to said first zone to prepare additional solution of Grignard reagent, whereby the ether is recirculated and a relatively small amount is employed.

3. In the process of preparing a reaction product over a period of time involving the use of a solution of a Grignard reagent in an ether which comprises applying to a metal capable of forming Grignard reagent in a first zone substantially continuously during the reaction period an organic halide and ether to produce the solution of Grignard reagent in the ether, withdrawing substantially continuously throughout the reaction period the solution of Grignard reagent from said first zone and conveying the solution to a second zone containing a substance which reacts with the Grignard reagent to form a relatively non-volatile product, distilling off the ether substantially continuously from the second zone, condensing the ether vapors, and substantially continuously conveying the condensed liquid ether to said first zone to prepare additional solution of Grignard reagent, whereby the ether is recirculated and a relatively small amount is employed.

CLYDE E. ARNTZEN.